United States Patent
Li et al.

(10) Patent No.: US 12,174,506 B2
(45) Date of Patent: Dec. 24, 2024

(54) TRANSPARENT DISPLAY STRUCTURE AND TRANSPARENT WINDOW HAVING DISPLAY FUNCTION

(71) Applicants: HEFEI BOE OPTOELECTRONICS TECHNOLOGY CO., LTD., Anhui (CN); BOE TECHNOLOGY GROUP CO., LTD., Beijing (CN)

(72) Inventors: Xiaobao Li, Beijing (CN); Wei Tian, Beijing (CN); Kui Gong, Beijing (CN)

(73) Assignees: HEFEI BOE OPTOELECTRONICS TECHNOLOGY CO. LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 842 days.

(21) Appl. No.: 17/288,591

(22) PCT Filed: Jun. 18, 2020

(86) PCT No.: PCT/CN2020/096761
§ 371 (c)(1),
(2) Date: Apr. 26, 2021

(87) PCT Pub. No.: WO2020/253765
PCT Pub. Date: Dec. 24, 2020

(65) Prior Publication Data
US 2021/0397059 A1    Dec. 23, 2021

(30) Foreign Application Priority Data
Jun. 19, 2019  (CN) .......................... 201910530642.5

(51) Int. Cl.
*G02F 1/155* (2006.01)
*E06B 9/24* (2006.01)
(Continued)

(52) U.S. Cl.
CPC ................ *G02F 1/155* (2013.01); *E06B 9/24* (2013.01); *G02F 1/133502* (2013.01);
(Continued)

(58) Field of Classification Search
CPC ............... E06B 9/24; E06B 2009/2464; G02F 1/133502; G02F 1/13439; G02F 1/15;
(Continued)

(56) References Cited

U.S. PATENT DOCUMENTS 5,377,037 A     12/1994  Branz et al.
7,116,309 B1 *  10/2006  Kimura .................... G09G 3/38
                                                    345/83
(Continued)

FOREIGN PATENT DOCUMENTS

CN     104698716 A    6/2015
CN     105572770 A    5/2016
(Continued)

OTHER PUBLICATIONS

First office action issued in Chinese Patent Application No. 201910530642.5 with search report.

*Primary Examiner* — Stephone B Allen
*Assistant Examiner* — Daniel Jeffery Jordan
(74) *Attorney, Agent, or Firm* — Chiwin Law LLC

(57) ABSTRACT

A transparent display structure and a transparent window having a display function are provided. The transparent display structure includes a first transparent base layer, a transparent display component layer, a first electrode layer, an electrochromic layer, a second electrode layer, and a semiconductor layer which are sequentially stacked. The semiconductor layer is configured to generate current under irradiation of light, the first electrode layer and the second electrode layer are configured to generate an electric field between the first electrode layer and the second electrode (Continued)

layer under an effect of the current, the electrochromic layer is configured that a color of the electrochromic layer changes under a control of the electric field, and the transparent display component layer has a function of displaying image.

18 Claims, 4 Drawing Sheets

(51) Int. Cl.
    *G02F 1/1335*      (2006.01)
    *G02F 1/1343*      (2006.01)
    *G02F 1/1514*      (2019.01)
    *G02F 1/153*      (2006.01)
    *G02F 1/157*      (2006.01)

(52) U.S. Cl.
    CPC ........ G02F 1/13439 (2013.01); G02F 1/1533 (2013.01); G02F 1/157 (2013.01); *E06B 2009/2464* (2013.01); *G02F 1/1514* (2019.01); *G02F 2202/10* (2013.01)

(58) Field of Classification Search
    CPC ...... G02F 1/1514; G02F 1/1533; G02F 1/155; G02F 1/157; G02F 2201/44; G02F 2202/10
    USPC ............... 359/229, 248, 265, 273, 275, 295, 359/489.11, 549, 580, 585, 609
    See application file for complete search history.

(56) References Cited

U.S. PATENT DOCUMENTS

| | | |
|---|---|---|
| 2009/0255576 A1 | 10/2009 | Tischler |
| 2010/0321758 A1* | 12/2010 | Bugno .................... B60R 1/088 359/267 |
| 2014/0198371 A1 | 7/2014 | Conklin et al. |
| 2018/0299740 A1* | 10/2018 | Takeuchi .............. G02F 1/1533 |
| 2021/0124227 A1 | 4/2021 | Li et al. |
| 2021/0223655 A1* | 7/2021 | Shu .................... H10K 59/1213 |

FOREIGN PATENT DOCUMENTS

| | | | |
|---|---|---|---|
| CN | 205723635 U | | 11/2016 |
| CN | 205767842 U | | 12/2016 |
| CN | 108594558 A | | 9/2018 |
| JP | 2003161808 A | * | 6/2003 |
| KR | 20140073754 A | * | 6/2014 |
| WO | 9745767 A1 | | 12/1997 |
| WO | 2018200702 A | | 11/2018 |
| WO | 2018200740 A2 | | 11/2018 |

* cited by examiner

TRANSPARENT DISPLAY STRUCTURE AND TRANSPARENT WINDOW HAVING DISPLAY FUNCTION

This application is a U.S. National Phase Entry of International Application No. PCT/CN2020/096761 filed on Jun. 18, 2020, designating the United States of America and claiming priority to Chinese Patent Application No. 201910530642.5, filed on Jun. 19, 2019. The present application claims priority to and the benefit of the above-identified applications and the above-identified applications are incorporated by reference herein in their entirety.

TECHNICAL FIELD

The present disclosure relates to a transparent display structure and a transparent window having a display function.

BACKGROUND

Under the case where a transparent display device or a semi-transparent display device displays, the scene on a non-display side of the display device can be seen. Vehicles, buildings and the like are provided with transparent glass windows for users to see outside scene. However, if the transparent glass windows just have this single function, the various requirements of users cannot be meet. If the transparent glass windows of vehicles, buildings and the like can be designed to have multiple functions, for example, technologies such as the transparent display or the semi-transparent display are integrated into the transparent windows, user's experience can be improved.

SUMMARY

At least one embodiment of the disclosure provides a transparent display structure. The transparent display structure comprises: a first transparent base layer, a transparent display component layer, a first electrode layer, an electrochromic layer, a second electrode layer, and a semiconductor layer which are sequentially stacked. The semiconductor layer is configured to generate current under irradiation of light, the first electrode layer and the second electrode layer are configured to generate an electric field between the first electrode layer and the second electrode layer under an effect of the current, the electrochromic layer is configured that a color of the electrochromic layer changes under a control of the electric field, and the transparent display component layer has a function of displaying images.

For example, in the transparent display structure provided by at least one embodiment of the disclosure, the semiconductor layer is configured to generate the current under excitation of light with a specific wavelength among the light.

For example, in the transparent display structure provided by at least one embodiment of the disclosure, the light with specific wavelength comprises ultraviolet light or blue light.

For example, in the transparent display structure provided by at least one embodiment of the disclosure, a material of the semiconductor layer comprises a Si-based semiconductor, or, the material of the semiconductor layer comprises at least one selected from the group consisting of GaN, ZnO, and a perovskite-based semiconductor.

For example, the transparent display structure provided by at least one embodiment of the disclosure further comprises: a third electrode layer which is transparent, is located on a side of the semiconductor layer facing away from the first transparent base layer and is electrically connected with the semiconductor layer. The third electrode layer and the first electrode layer are both grounded, or, the third electrode layer is electrically connected with the first electrode layer and the second electrode layer is grounded.

For example, in the transparent display structure provided by at least one embodiment of the disclosure, the third electrode layer is a mesh electrode layer with openings, or the third electrode layer comprises a plurality of pins provided on the semiconductor layer in a matrix.

For example, in the transparent display structure provided by at least one embodiment of the disclosure, a thickness of the electrochromic layer in a direction perpendicular to the first transparent base layer is ranged from 100 nm to 1500 nm.

For example, in the transparent display structure provided by at least one embodiment of the disclosure, a material of the electrochromic layer comprises at least one selected from the group consisting of phosphotungstic acid, tungsten trioxide, pyrazoline, polythiophenes and derivatives thereof, viologen, tetrathiafulvalene, metal phthalocyanine compounds, and metal-organic frameworks (MOFs).

For example, the transparent display structure provided by at least one embodiment of the disclosure further comprises: a light efficiency enhancement layer provided on a side of the semiconductor layer facing away from the first transparent base layer to reduce light reflection of the semiconductor layer.

For example, in the transparent display structure provided by at least one embodiment of the disclosure, the light efficiency enhancement layer is configured as an anti-reflection layer that increases a transmittance of the light with specific wavelength.

For example, in the transparent display structure provided by at least one embodiment of the disclosure, the light efficiency enhancement layer is a single layer, and a refractive index of the light efficiency enhancement layer is smaller than a refractive index of the semiconductor layer.

For example, in the transparent display structure provided by at least one embodiment of the disclosure, an optical thickness of the light efficiency enhancement layer is nh, and $nh=\lambda_0/4$, where n is the refractive index of the light efficiency enhancement layer, h is a thickness of the light efficiency enhancement layer in a direction perpendicular to the first transparent base layer, and $\lambda_0$ is a wavelength of the light with specific wavelength.

For example, in the transparent display structure provided by at least one embodiment of the disclosure, under a case where the transparent display structure comprises the third electrode layer, the third electrode layer is located between the semiconductor layer and the light efficiency enhancement layer, and the refractive index of the light efficiency enhancement layer is smaller than a refractive index of a layer, directly in contact with the light efficiency enhancement layer, among the third electrode layer and the semiconductor layer.

For example, in the transparent display structure provided by at least one embodiment of the disclosure, the light efficiency enhancement layer comprises a first layer and a second layer which are stacked, and the second layer is located on a side of the first layer close to the first transparent base layer; and a refractive index of the first layer is smaller than a refractive index of the second layer, and the refractive index of the second layer is smaller than a refractive index of the semiconductor layer.

For example, in the transparent display structure provided by at least one embodiment of the disclosure, an optical thickness of the first layer is $n_1 h_1$, and $n_1 h_1 = \lambda_0/4$, an optical thickness of the second layer is $n_2 h_2$, and $n_2 h_2 = \lambda_0/4$, where $n_1$ is the refractive index of the first layer, $h_1$ is a thickness of the first layer in a direction perpendicular to the first transparent base layer, $n_2$ is the refractive index of the second layer, $h_2$ is a thickness of the first layer in the direction perpendicular to the first transparent base layer, and $\lambda_0$ is a wavelength of the light with specific wavelength.

For example, in the transparent display structure provided by at least one embodiment of the disclosure, under a case where the transparent display structure comprises the third electrode layer, the third electrode layer is located between the semiconductor layer and the light efficiency enhancement layer, and the refractive index of the second layer is smaller than a refractive index of a layer, directly in contact with the second layer, among the third electrode layer and the semiconductor layer.

For example, in the transparent display structure provided by at least one embodiment of the disclosure, the light efficiency enhancement layer adopts an inorganic oxide material or an organic polymer material as a base material, and a foaming material and/or nanoparticles are added into the base material.

For example, the transparent display structure provided by at least one embodiment of the disclosure further comprises: an insulation layer provided between the first electrode layer and the transparent display component layer.

For example, in the transparent display structure provided by at least one embodiment of the disclosure, under a case where the transparent display structure is in a first state, no electric field is provided between the first electrode layer and the second electrode layer, the transparent display component layer is turned off, and the transparent display structure is in a transparent state and does not perform display; under a case where the transparent display structure is in a second state, no electric field is provided between the first electrode layer and the second electrode layer, the transparent display component layer is turned on, and the transparent display structure performs transparent display; under a case where the transparent display structure is in a third state, the electric field is provided between the first electrode layer and the second electrode layer, the transparent display component layer is turned off, the color of the transparent display structure changes, and a light transmittance of the transparent display structure is lower than a light transmittance of the transparent display structure under a case where no electric field is provided between the first electrode layer and the second electrode layer; and under a case where the transparent display structure is in a fourth state, the electric field is provided between the first electrode layer and the second electrode layer, the transparent display component layer is turned on, the color of the transparent display structure changes, and the transparent display structure performs semi-transparent display or one-sided display.

At least one embodiment of the disclosure provides a transparent window having a display function, the transparent window comprises the transparent display structure provided by any one of the embodiments as described above.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

Figure 1:
FIG. 1 is a structural schematic diagram of a transparent display structure provided by at least one embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the present disclosure, do not intend to indicate any sequence, amount or importance, but distinguish various components. Similarly, the terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the described object is changed, the relative position relationship may be changed accordingly.

In order to further explain the technical solutions and effects adopted by the disclosure for purpose of achieving the intended purpose, the transparent display structure and the transparent window with display function, and the specific implementation, structure, features and effects thereof according to the disclosure are described in detail below with reference to the drawings and exemplary embodiments. In the following description, different "one embodiment" or "at least embodiment" do not necessarily refer to the same embodiment or different embodiments. In addition, specific features, structures, or features in one or more embodiments may be combined in any suitable form.

For example, at least one embodiment of the present disclosure provides a transparent display structure. The transparent display structure includes a first transparent base layer, a transparent display component layer, a first electrode layer, an electrochromic layer, a second electrode layer, and a semiconductor layer which are stacked sequentially. The semiconductor layer is configured to generate current under irradiation of light, the first electrode layer and the second electrode layer are configured to generate an electric field between the first electrode layer and the second electrode layer under an effect of the current, the electrochromic layer is configured that a color of the electrochromic layer changes under a control of the electric field, and the transparent display component layer has a function of displaying images.

Exemplarily, FIG. 1 is a structural schematic diagram of the transparent display structure provided by at least one embodiment of the present disclosure. As shown in FIG. 1, the transparent display structure provided by at least one embodiment of the present disclosure for example is used as a transparent window having a display function. For example, the transparent display structure includes a first transparent base layer 1, a transparent display component layer 2, a first electrode layer 3, an electrochromic layer 4, a second electrode layer 5, a semiconductor layer 6, and a second transparent base layer 7 which are sequentially stacked. The semiconductor layer 6 is configured to generate current under irradiation of light. The first electrode layer 3 and the second electrode layer 5 are configured to generate an electric field between the first electrode layer 3 and the second electrode layer 5 under an effect of the current, and the electrochromic layer 4 is configured that a color of the electrochromic layer 4 changes under a control of the electric field. The transparent display component layer 2 has a function of displaying image.

For example, the transparent window having the display function is a window of a building or a window of a vehicle, and the transparent display structure provided by at least one embodiment of the present disclosure is used to replace the glass of conventional glass window or conventional transparent acrylic light-transmissive plate.

The first transparent base layer 1 is a flat plate or a plate with a certain curvature, and the specific shape of the first transparent base layer 1 for example is selected according to actual requirements. The material of the first transparent base layer 1 for example is glass or acrylic. For example, the second transparent base layer 7 has the same structure and material as the first transparent base layer 1.

The transparent display component layer 2 is a display device having a transparent state, which realizes display independently, and for example is OLED, LCD, RLCD, QLED, Micro LED and any other display devices. For example, the transparent display component layer 2 is directly provided on the first transparent base layer 1 by adopting the method of manufacturing a display panel. The shape of the transparent display component layer 2 and the curvature of the transparent display component layer 2 need to be adapted to the first transparent base layer 1. For example, the transparent display component layer 2 further includes a driving circuit for driving display, such as a pixel driving circuit and any other wirings for transmitting display signals. As for these display devices, the driving circuit, and the wirings, those skilled in the art may design them according to suitable techniques, which are not limited by the embodiments of the present disclosure.

The first electrode layer 3 and the second electrode layer 5 for example are formed by sputtering, depositing, ink jetting, spin coating, screen printing, etc., and need to be transparent electrode layers. A material of the first electrode layer 3 and the second electrode layer 5 for example includes a conductive metal, an N-type oxide semiconductor-indium tin oxide (ITO), grapheme and the like. For example, thicknesses of the first electrode layer 3 and the second electrode layer 5 are selected according to the thickness of the electrode layer in the manufacturing process of the display panel.

The electrochromic layer 4 for example is directly formed on the first electrode layer 3 by spin coating, depositing, printing, polymerizing and the like. For example, metal ions, such as magnesium ions, iron ions, chromium ions, nickel ions, titanium ions and the like, which is capable of affecting the color, are added into a base material to obtain the electrochromic layer 4; under the case where the electric field is applied to both sides of the electrochromic layer 4, the color of the electrochromic layer 4 changes to shade sunlight.

The semiconductor layer 6 for example is directly formed on the second electrode layer 5 by plasma enhanced chemical vapor deposition (PECVD), sputtering, atomic layer deposition (ALD) and the like. The semiconductor layer 6 generates carriers under the irradiation of sunlight, the carriers form a current, the current is conducted to the second electrode layer 5, and then the electric field is generated between the first electrode layer 3 and the second electrode layer 5.

In the transparent display structure provided by the embodiments of the present disclosure, the semiconductor layer 6 of the transparent display structure generates the current under the irradiation of light, and the current flows to the second electrode layer 5, so that the electric field is generated between the first electrode layer 3 and the second electrode layer 5. Then the color of the electrochromic layer 4 changes, so that the transparent display structure has the function of blocking light. For example, under the irradiation of the sunlight, the transparent display structure has the function of shading the sunlight, including blocking the ultraviolet rays. In addition, the electrochromic layer 4 which changes color for example is used as the background plate of the transparent display component layer 2, so that the transparent display component layer 2 display video or image on a side of the transparent display structure and the use's experience is improved. To sum up, the transparent display structure provided by the embodiments of the present disclosure for example is used as the glass plate of the transparent window, has the light blocking function, such as blocking the sunlight, and has the display function, and thus the transparent display structure provided by the embodiments of the present disclosure meets various requirements of users.

As shown in FIG. 1, for example, the semiconductor layer 6 is configured to generate the current under the excitation of light with a specific wavelength among the light. For example, the semiconductor layer 6 includes a semiconductor capable of being excited by ultraviolet light, that is, the light with specific wavelength is ultraviolet light. In this way, the ultraviolet light irradiated to the semiconductor layer 6 excites the semiconductor layer 6 to generate pairs of holes and electrons, thereby forming a built-in electric field inside the semiconductor layer 6. Under the case where the semiconductor layer 6, the first electrode layer 3 and the second electrode layer 5 respectively provided on two sides of the electrochromic layer 4 are connected into a loop, the current is generated. Then, the electric field between two sides of the electrochromic layer 4 is formed, and the electrochromic layer 4 changes in its color under the control of the electric field. In this process, the energy of the ultraviolet light is attenuated, which is equivalent that the ultraviolet light is absorbed, thus the ultraviolet light is blocked. In addition, the electrochromic layer 4 which changes in its color has the function of blocking light. For example, the electrochromic layer 4 is transparent if the electric field is not applied to the electrochromic layer 4; and if the electric field is applied to the electrochromic layer 4, the color of the electrochromic layer 4 changes, the transparency of the electrochromic layer 4 decreases and the electrochromic layer 4 blocks light of various colors. The ultraviolet light causes the most serious damage to human body among the sunlight; the transparent display structure provided by the embodiments of the disclosure not only has the function of shading the sunlight, but also blocks the ultraviolet light. The semiconductor layer 6 includes the semiconductor capable of being excited by the ultraviolet light; under the condition of stronger ultraviolet light is irradiated, more current is generated in the semiconductor layer 6, so that the electric field between the first electrode and the second electrode is larger, and the electrochromic layer 4 changes color further and becomes darker so as to protect the user from being damaged by the ultraviolet light. In addition, the ultraviolet light has short wavelength and high energy, and the effect of exciting the semiconductor layer to generate the current is better.

For example, in other embodiments, the light with specific wavelength is blue light. Blue light has relatively higher energy and thus achieves the desired effects as well.

For example, a material of the semiconductor layer 6 includes silicon, germanium, gallium arsenide and the like. In order to increase carriers, high-valent elements such as trivalent elements (such as boron) and pentavalent elements (such as phosphorus) for example are doped in the semiconductor layer 6.

For example, the material of the semiconductor layer 6 capable of being excited by ultraviolet light includes an inorganic material such as Si-based semiconductor, GaN and ZnO, or includes a perovskite-based semiconductor. Taking the Si-based semiconductor as an example, the Si-based semiconductor includes a PN junction formed by combining P-type semiconductor and N-type semiconductor. The p-type semiconductor contains holes and the n-type semiconductor contains free electrons. Under the case where the Si-based semiconductor is irradiated by the sunlight, the electrons in Si atoms are excited by light energy, and the pairs of holes and electrons generated by the excitation form the built-in electric field. These electrons and holes are affected by the built-in potential, and are attracted by the N-type semiconductor and the P-type semiconductor, respectively, so that these electrons and holes are collected at two ends of the semiconductor layer 6, respectively. For example, these electrons and holes are located at a first end of the semiconductor layer 6 close to the first transparent base layer 1 and a second end close to the second transparent base layer 7, respectively. Under the case where the semiconductor is connected into a loop, the current is led out to form a voltage source.

Figure 2A:
FIG. 2A is another structural schematic diagram of the transparent display structure provided by at least one embodiment of the present disclosure.

As shown in FIG. 2A, for example, the display structure further includes a third electrode layer 8 which is transparent. The third electrode layer 8 is located on a side of the semiconductor layer 6 facing away from the first transparent base layer 1, and is electrically connected with the semiconductor layer 6. For example, the third electrode layer 8 is located between the semiconductor layer 6 and the second transparent base layer 7.

Figure 2B:
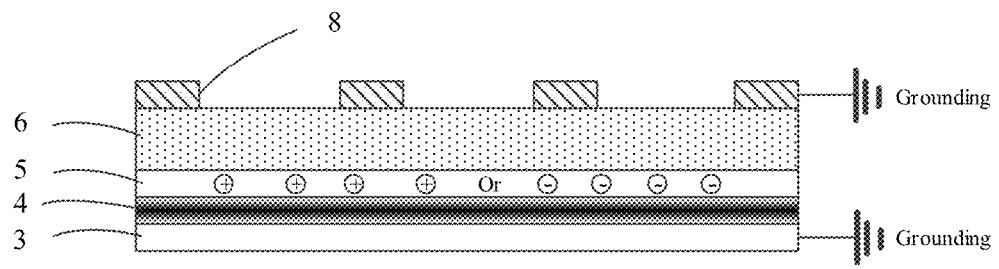
FIG. 2B is a schematic diagram of a circuit of a semiconductor layer.

For example, as shown in FIG. 2B, each of the third electrode layer 8 and the first electrode layer 3 is grounded. For example, the third electrode layer 8 is grounded for example by a switch.

For example, the current generated by the semiconductor layer 6 is led out through the third electrode layer 8; thus after providing the third electrode layer 8, the transparent display structure provided by the embodiments of the present disclosure has two specific connection manner during operation.

One connection manner is shown in FIG. 2B. For example, the third electrode layer 8 is grounded through a switch. Under the case where the light is irradiated on the semiconductor layer 6, the current generated by the semiconductor layer 6 is controlled to be led to the ground or not by the switch, so that the electric field between the first electrode layer 3 and the second electrode layer 5 is controlled by the switch. For example, the current generated by the semiconductor layer 6 under illumination is led to the ground, so that there is no electric field between the first electrode layer 3 and the second electrode layer 5, and the electrochromic layer 4 does not change color.

Figure 2C:
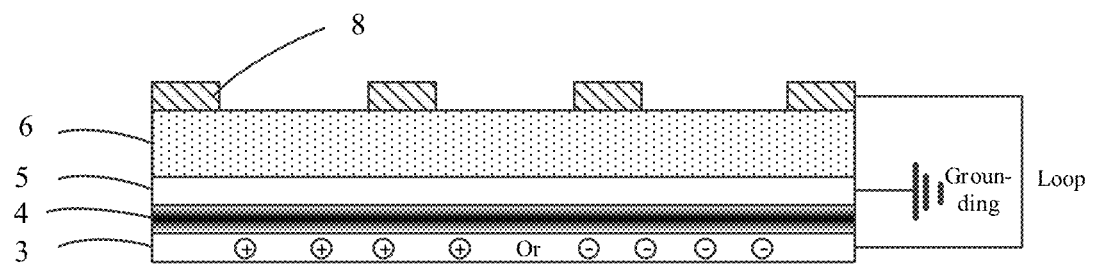
FIG. 2C is another schematic diagram of the circuit of the semiconductor layer.

One connection manner is shown in FIG. 2C. For example, the third electrode layer 8 is connected with the first electrode layer 3, and the second electrode layer 5 is grounded, for example, by a switch. For example, under the case where the light is irradiated on the semiconductor layer 6, the current generated by the semiconductor layer 6 flows into the first electrode layer 3, thereby causing that the electric field is generated between the first electrode layer 3 and the second electrode layer 5, and thus causing that the electrochromic layer 4 changes color. For example, whether the second electrode layer 5 is grounded or not is controlled by the switch so as to realize the control of the color change of the electrochromic layer 4.

In at least one embodiment, in order to ensure that light is irradiated to the semiconductor layer 6, the third electrode layer 8 needs to be made of a conductive material with high transparency. As shown in FIG. 2B, for example, the third electrode layer 8 is a mesh electrode layer with openings. For example, the third electrode layer 8 includes a plurality of pins provided on the semiconductor layer 6 in a matrix.

As shown in FIG. 1, for example, the thickness of the electrochromic layer 4 is ranged from 100 nm to 1500 nm. For example, the material of the electrochromic layer 4 includes at least one selected from the group consisting of phosphotungstic acid, tungsten trioxide, pyrazoline, polythiophenes and derivatives thereof, viologen, tetrathiafulvalene, metal phthalocyanine compounds, and metal-organic frameworks (MOFs).

For example, MOFs is an organic-inorganic hybrid material having intramolecular pores, which is formed by self-assembly of organic ligands and metal ions or clusters through coordination bonds. The ion diffusion rate of MOFs is several times as lager as the ion diffusion rate of conventional color-changing method, sot that a fast response is realized.

Figure 3A:
FIG. 3A is another structural schematic diagram of the transparent display structure provided by at least one embodiment of the present disclosure.

FIG. 3A is another structural schematic diagram of the transparent display structure provided by at least one embodiment of the present disclosure. As shown in FIG. 3A, for example, the transparent display structure provided by the embodiments of the present disclosure further includes a light efficiency enhancement layer 9. The light efficiency enhancement layer 9 is provided on the side of the semiconductor layer 6 facing away from the first transparent base layer 1. For example, the light efficiency enhancement layer 9 is provided between the semiconductor layer 6 and the second transparent base layer 7, and the light efficiency enhancement layer 9 is configured to reduce a light reflection of the semiconductor layer 6. For example, the light efficiency enhancement layer 9 is configured to reduce a total light reflection of the semiconductor layer 6.

For example, the light efficiency enhancement layer 9 is an anti-reflection film capable of increasing transmittance; the light efficiency enhancement layer 9 is configured as the anti-reflection film that increases the transmittance of the light with specific wavelength. The light efficiency enhancement layer 9 reduces the reflection of light by the semiconductor layer 6 and improves the light absorption rate.

Figure 3B:
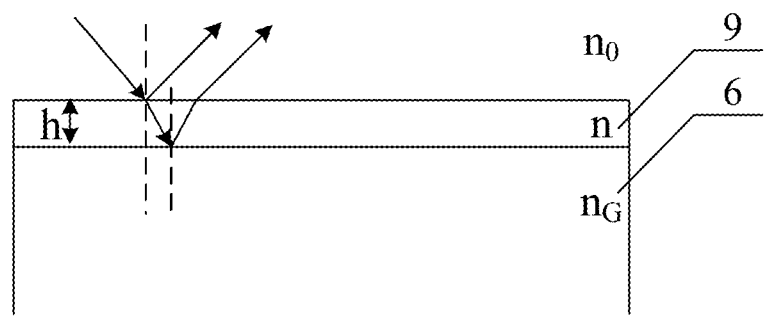
FIG. 3B is a schematic diagram of the light efficiency enhancement layer.

As shown in FIG. 3B, the light efficiency enhancement layer 9 is a single layer, and the refractive index n of the light efficiency enhancement layer 9 is smaller than the refractive index no of the semiconductor layer 6. An optical thickness nh of the light efficiency enhancement layer satisfies that $nh=\lambda_0/4$, n is the refractive index of the light efficiency enhancement layer, h is a thickness of the light efficiency enhancement layer in the direction perpendicular to the first transparent base layer, and $\lambda_0$ is the wavelength of the light with specific wavelength. The wavelength of the ultraviolet light is ranged from 100 nm to 400 nm, and the wavelength of the visible light is ranged from 400 nm to 760 nm. For example, the thickness of the light efficiency enhancement layer 9 is ranged from 25 nm to 100 nm to improve the transmittance of the ultraviolet light, thereby improving the absorption rate of the ultraviolet light.

The wavelength of the blue light is ranged from 410 nm to 470 nm. For example, the thickness of the light efficiency enhancement layer 9 is ranged from 102.5 nm to 117.5 nm to improve the transmittance of the blue light, thereby improving the absorption rate of the blue light.

Figure 3C:
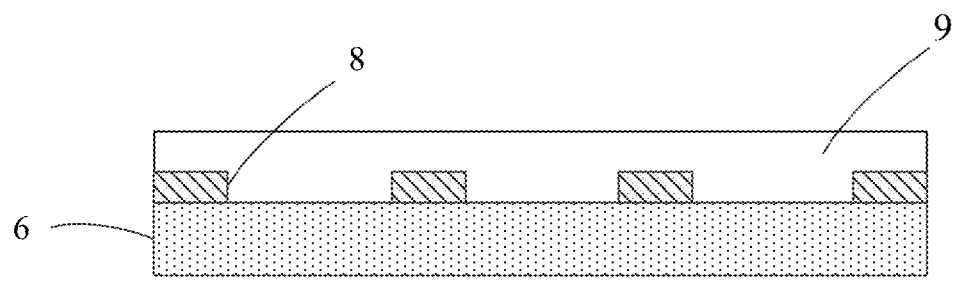
FIG. 3C is another schematic diagram of the light efficiency enhancement layer.

For example, under the case where the transparent display structure includes the third electrode layer, the third electrode layer is located between the semiconductor layer and the light efficiency enhancement layer, and the refractive index of the light efficiency enhancement layer is smaller than the refractive index of the layer, directly in contact with the light efficiency enhancement layer, among the third electrode layer and the semiconductor layer. Exemplarily, in at least one embodiment, as shown in FIG. 3C, the transparent display structure includes the third electrode layer 8, the third electrode layer 8 is provided between the semiconductor layer 6 and the light efficiency enhancement layer 9; for example, the third electrode layer 8 is the mesh electrode layer with openings or includes the plurality of pins provided on the semiconductor layer in a matrix, the light efficiency enhancement layer 9 is directly in contact with the third electrode layer 8 in some regions, and the light efficiency enhancement layer 9 is directly in contact with the semiconductor layer 6 in some other regions; in this case, the refractive index of the light efficiency enhancement layer 9 is smaller than the refractive index of the third electrode layer 8 and is smaller than the refractive index of the semiconductor layer 6, so that the transmittance of the light with specific wavelength is increased in both the region covered by the third electrode layer 8 and the region not covered by the third electrode layer 8. In other embodiments, for example, the light efficiency enhancement layer 9 and the semiconductor layer 6 are separated from each other by the third electrode layer 8, the light efficiency enhancement layer 9 is not directly in contact with the semiconductor layer 6 but is directly in contact with the third electrode layer 8. For example, the third electrode layer 8 covers the entire surface of the semiconductor layer 6 facing away from the first transparent base layer 1. In this case, it is enough to satisfy that the refractive index of the light efficiency enhancement layer 9 is smaller than the refractive index of the third electrode layer 8.

Figure 3D:
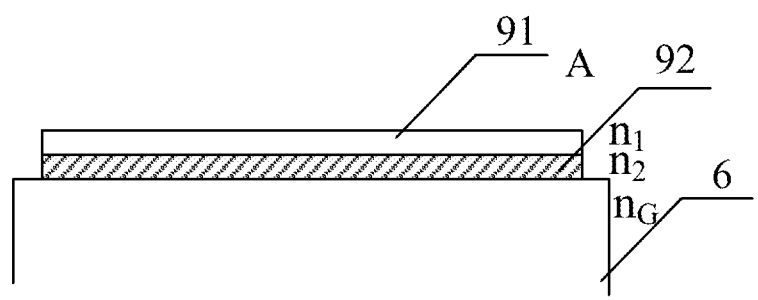
FIG. 3D is another schematic diagram of a light efficiency enhancement layer.

For example, in at least one embodiment, as shown in FIG. 3D, the light efficiency enhancement layer 9 includes a first layer 91 and a second layer 92 which are stacked. The second layer 92 is located on a side of the first layer 91 close to the first transparent base layer. The refractive index $n_1$ of the first layer 91 is smaller than the refractive index of the second layer 92, and the refractive index of the second layer 92 is smaller than the refractive index $n_G$ of the semiconductor layer 6, that is, $n_1<n_2<n_G$.

For example, an optical thickness of the first layer 91 is $n_1h_1$, $n_1h_1=\lambda_0/4$; an optical thickness of the second layer 92 is $n_2h_2$, $n_2h_2=\lambda_0/4$; $n_1$ is a refractive index of the first layer 91, $h_1$ is a thickness of the first layer 91 in the direction perpendicular to the first transparent base layer 1, $n_2$ is a refractive index of the second layer 92, $h_2$ is a thickness of the first layer 91 in the direction perpendicular to the first transparent base layer 1, and $\lambda_0$ is the wavelength of the light with specific wavelength. For example, the light with specific wavelength is the above-mentioned ultraviolet light or blue light.

Figure 3E:
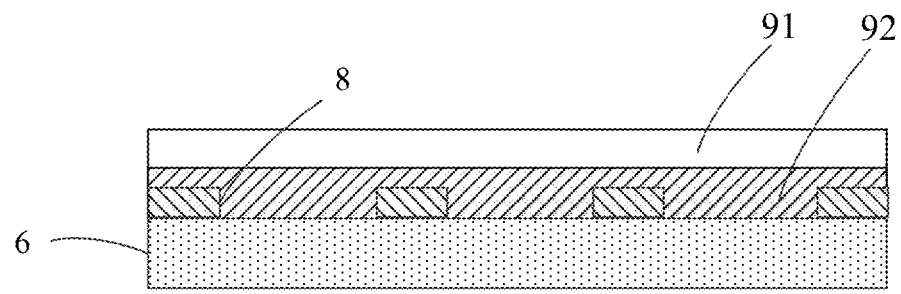
FIG. 3E is another schematic diagram of the light efficiency enhancement layer.

For example, the transparent display structure includes the third electrode layer, the third electrode layer is located between the semiconductor layer and the second layer, and the refractive index of the second layer is smaller than the refractive index of the layer, directly in contact with the second layer, among the third electrode layer and the semiconductor layer. For example, in at least one embodiment, as shown in FIG. 3E, the transparent display structure includes the third electrode layer 8, the third electrode layer 8 is located between the semiconductor layer 6 and the second layer 92; for example, the third electrode layer 8 is the mesh electrode layer with openings or includes the plurality of pins provided on the semiconductor layer in a matrix, the second layer 92 is directly in contact with the third electrode layer 8 in some regions, and the second layer 92 is directly in contact with the semiconductor layer 6 in some other regions; in this case, the refractive index of the second layer 92 is smaller than the refractive index of the third electrode layer 8 and is smaller than the refractive index of the semiconductor layer 6, so that the transmittance of the light with specific wavelength is increased in both the region covered by the third electrode layer 8 and the region not covered by the third electrode layer 8. For example, in at least one embodiment, the second layer 92 and the semiconductor layer 6 are separated from each other by the third electrode layer 8, the second layer 92 is not directly in contact with the semiconductor layer 6 but is directly in contact with the third electrode layer 8. For example, the third electrode layer 8 covers the entire surface of the semiconductor layer 6 facing away from the first transparent base layer 1; in this case, it is enough that the refractive index of the second layer 92 is only less than the refractive index of the third electrode layer 8.

Further, the light efficiency enhancement layer 9 for example adopts an inorganic oxide material or an organic polymer material as a base material, and a foaming material and/or nanoparticles are added into the base material.

For example, the inorganic oxide material includes at least one selected from the group consisting of an oxide, a nitride, and an oxynitride. The organic polymer material for example includes at least one selected from the group consisting of polyethylene, polyterephthalate plastics, polycarbonate, and polymethylmethacrylate. For example, the foaming material, such as azodicarbonamide (AC), diethyl azodicarboxylate, p-toluenesulfonyl semicarbazide, and the like, produces pores in the light efficiency enhancement layer and increases light scattering. The nanoparticles for example includes at least one selected from the group consisting of nano silicon oxide, nano zinc oxide, nano aluminum oxide, nano zirconium oxide, nano cerium oxide, and nano iron oxide.

Figure 4:
FIG. 4 is another structural schematic diagram of the transparent display structure provided by at least one embodiment of the present disclosure.

As shown in FIG. 4, for example, the transparent display structure provided by the embodiments of the present disclosure further includes an insulation layer 10, and the insulation layer 10 is provided between the first electrode layer 3 and the transparent display component layer 2.

For example, the insulation layer 10 is formed as a film by plasma enhanced chemical vapor deposition (PECVD), sputtering, atomic layer deposition (ALD), etc., and the insulation layer 10 is configured to shield the transparent display component layer 2 from the first electrode layer 3 so that the influence of the electric field on the transparent display component layer 2 is prevented. Meanwhile, the insulation layer 10 plays a planarization role. The material of the insulation layer 10 for example includes nitride, oxide, oxynitride, and organic polymer, etc., such as silicon nitride, silicon oxide, and silicon oxynitride.

In at least one embodiment, under the case where the transparent display structure is in a first state, no electric field is provided between the first electrode layer 3 and the second electrode layer 5, and the transparent display component layer 2 is turned off. Under the case where the transparent display structure is in a second state, no electric field is provided between the first electrode layer 3 and the second electrode layer 5, and the transparent display component layer 2 is turned on. Under the case where the transparent display structure is in a third state, the electric field is provided between the first electrode layer 3 and the second electrode layer 5, the transparent display component layer 2 is turned off, the color change of the transparent display structure occurs, and the light transmittance of the transparent display structure is lower than the light transmittance of the transparent display structure under the case where no electric field is provided between the first electrode layer and the second electrode layer. Under the case where the transparent display structure is in a fourth state, the electric field is provided between the first electrode layer 3 and the second electrode layer 5, and the transparent display component layer is turned on.

For example, during using the transparent display structure, the first state of the transparent display structure is a transparent state, the second state of the transparent display structure is a transparent display state, the third state of the transparent display structure is a state of shading the sunlight, and the fourth state of the transparent display structure is a semi-transparent display state or an opaque one-sided display state.

The first electrode layer 3, the electrochromic layer 4, the second electrode layer 5, and the semiconductor layer 6 for example are regarded as a main body to be executed. By grounding the first electrode layer 3 and/or the second electrode layer 5 and providing the switch between the electrode layer and the ground, whether the current generated by the semiconductor layer 6 is conducted to the ground or not is controlled, thereby controlling whether the electric field is generated between the first electrode layer 3 and the second electrode layer 5 or not, and finally controlling whether the electrochromic layer 4 changes color or not. For example, the second electrode layer 5 is connected with the ground through the switch; under the case where the sunlight irradiates on the semiconductor layer 6, the current generated by the semiconductor layer 6 is transmitted to the second electrode layer 5 and then whether the current is conducted to the ground or not is controlled by the switch, thereby controlling the electric field between the first electrode layer 3 and the second electrode layer 5.

In addition, the transparent display component layer 2 is independently connected with a power supply device and a signal transmission device through a switch, so that the display of the transparent display structure is controlled in combination whether the electrochromic layer 4 changes color or not, and finally the four states of the transparent display structure are realized.

The realization of the above four states of the transparent display structure is controlled and executed by a control system electrically connected with the transparent display structure after installing the transparent display structure on a vehicle, an electronic device, or a building.

For example, at least one embodiment of the present disclosure further provides a transparent window having a display function, and the transparent window includes any one of the transparent display structures provided by the embodiments of the present disclosure.

The transparent window for example is used as a car window, passengers watch videos or images played by the transparent window. Meanwhile, the transparent window also has the functions of blocking light, such as shading the sunlight and preventing the ultraviolet light. In this way, the transparent window can meet various requirements of the passengers.

For example, the transparent window described here directly uses the transparent display structure provided in the embodiments described above. For specific implementation structure, please refer to the related contents described in the embodiments described above, which will not be repeated here. The transparent display structure for example is used as the car window, so that the car window has a transparent function and a display function. The transparent display structure for example is used as the display window of buildings or electronic equipment.

In the transparent display structure provided by the embodiments of the present disclosure, the semiconductor layer 6 generates the current under irradiation of light, the current is transmitted to the second electrode layer 5 so that the electric field is generated between the first electrode layer 3 and the second electrode layer 5, and then the color of the electrochromic layer 4 changes, so that the transparent display structure has the function of shading sunlight, such as blocking ultraviolet rays. In addition, the electrochromic layer 4 whose color changes serves as the back plate of the transparent display component layer 2, so that the transparent display component layer 2 plays videos or displays images on a side of the transparent display structure.

To sum up, the transparent display structure provided by the embodiments of the disclosure can be used as the transparent window with sunlight shading function and display function, thereby meeting the requirements of users.

The foregoing embodiments merely are exemplary embodiments of the disclosure, and not intended to define the scope of the disclosure, and the scope of the disclosure is determined by the appended claims.

What is claimed is:

1. A transparent display structure, comprising:
a first transparent base layer, a transparent display component layer, a first electrode layer, an electrochromic layer, a second electrode layer, and a semiconductor layer which are sequentially stacked, wherein the semiconductor layer is configured to generate current under irradiation of light, the first electrode layer and the second electrode layer are configured to generate an electric field between the first electrode layer and the second electrode layer under an effect of the current, the electrochromic layer is configured that a color of the electrochromic layer changes under a control of the electric field, and the transparent display component layer has a function of displaying images, and the transparent display structure further comprises:
a light efficiency enhancement layer provided on a side of the semiconductor layer facing away from the first transparent base layer to reduce light reflection of the semiconductor layer, wherein the light efficiency enhancement layer is a single layer, and a refractive index of the light efficiency enhancement layer is smaller than a refractive index of the semiconductor layer, and the transparent display structure further comprises: a third electrode layer which is transparent, is located on a side of the semiconductor layer facing away from the first transparent base layer and is electrically connected with the semiconductor layer, wherein the third electrode layer is located between the semiconductor layer and the light efficiency enhancement layer, and the refractive index of the light efficiency enhancement layer is smaller than a refractive index of a layer, directly in contact with the light efficiency enhancement layer, among the third electrode layer and the semiconductor layer.

2. The transparent display structure according to claim 1, wherein
the semiconductor layer is configured to generate the current under excitation of light with a predetermined wavelength among the light.

3. The transparent display structure according to claim 2, wherein
the light with the predetermined wavelength comprises ultraviolet light or blue light.

4. The transparent display structure according to claim 1, wherein
a material of the semiconductor layer comprises a Si-based semiconductor, or
the material of the semiconductor layer comprises at least one selected from the group consisting of GaN, ZnO, and a perovskite-based semiconductor.

5. The transparent display structure according to claim 1, wherein
the third electrode layer and the first electrode layer are both grounded, or, the third electrode layer is electrically connected with the first electrode layer and the second electrode layer is grounded.

6. The transparent display structure according to claim 5, wherein
the third electrode layer is a mesh electrode layer with openings, or
the third electrode layer comprises a plurality of pins provided on the semiconductor layer in a matrix.

7. The transparent display structure according to claim 1, wherein
a thickness of the electrochromic layer in a direction perpendicular to the first transparent base layer is ranged from 100 nm to 1500 nm.

8. The transparent display structure according to claim 1, wherein
a material of the electrochromic layer comprises at least one selected from the group consisting of phosphotungstic acid, tungsten trioxide, pyrazoline, polythiophenes and derivatives thereof, viologen, tetrathiafulvalene, metal phthalocyanine compounds, and metal-organic frameworks (MOFs).

9. The transparent display structure according to claim 1, wherein
the semiconductor layer is configured to generate the current under excitation of light with a predetermined wavelength among the light,
the light efficiency enhancement layer is configured as an anti-reflection layer that increases a transmittance of the light with the predetermined wavelength.

10. The transparent display structure according to claim 1, wherein
an optical thickness of the light efficiency enhancement layer is nh, and $nh=\lambda_0/4$,
where n is the refractive index of the light efficiency enhancement layer, h is a thickness of the light efficiency enhancement layer in a direction perpendicular to the first transparent base layer, and $\lambda_0$ is a wavelength of the light with a predetermined wavelength.

11. A transparent display structure, comprising:
a first transparent base layer, a transparent display component layer, a first electrode layer, an electrochromic layer, a second electrode layer, and a semiconductor layer which are sequentially stacked, wherein the semiconductor layer is configured to generate current under irradiation of light, the first electrode layer and the second electrode layer are configured to generate an electric field between the first electrode layer and the second electrode layer under an effect of the current, the electrochromic layer is configured that a color of the electrochromic layer changes under a control of the electric field, and the transparent display component layer has a function of displaying images; and the transparent display structure further comprises:
a light efficiency enhancement layer provided on a side of the semiconductor layer facing away from the first transparent base layer to reduce light reflection of the semiconductor layer, wherein the light efficiency enhancement layer comprises a first layer and a second layer which are stacked, and the second layer is located on a side of the first layer close to the first transparent base layer; and a refractive index of the first layer is smaller than a refractive index of the second layer, and the refractive index of the second layer is smaller than a refractive index of the semiconductor layer, and the transparent display structure further comprises: a third electrode layer which is transparent, is located on a side of the semiconductor layer facing away from the first transparent base layer and is electrically connected with the semiconductor layer, wherein the third electrode layer is located between the semiconductor layer and the light efficiency enhancement layer, and the refractive index of the second layer is smaller than a refractive index of a layer, directly in contact with the second layer, among the third electrode layer and the semiconductor layer.

12. The transparent display structure according to claim 11, wherein
an optical thickness of the first layer is $n_1h_1$, and $n_1h_1=\lambda_0/4$,
an optical thickness of the second layer is $n_2h_2$, and $n_2h_2=\lambda_0/4$,
where $n_1$ is the refractive index of the first layer, $h_1$ is a thickness of the first layer in a direction perpendicular to the first transparent base layer, $n_2$ is the refractive index of the second layer, $h_2$ is a thickness of the second layer in the direction perpendicular to the first transparent base layer, and $\lambda_0$ is a wavelength of the light with a predetermined wavelength.

13. The transparent display structure according to claim 1, wherein
the light efficiency enhancement layer adopts an inorganic oxide material or an organic polymer material as a base material, and a foaming material and/or nanoparticles are added into the base material.

14. The transparent display structure according to claim 1, further comprising:
an insulation layer provided between the first electrode layer and the transparent display component layer.

15. The transparent display structure according to claim 1, wherein
under a case where the transparent display structure is in a first state, no electric field is provided between the first electrode layer and the second electrode layer, the transparent display component layer is turned off, and the transparent display structure is in a transparent state and does not perform display;
under a case where the transparent display structure is in a second state, no electric field is provided between the first electrode layer and the second electrode layer, the transparent display component layer is turned on, and the transparent display structure performs transparent display;
under a case where the transparent display structure is in a third state, the electric field is provided between the first electrode layer and the second electrode layer, the transparent display component layer is turned off, the color of the transparent display structure changes, and a light transmittance of the transparent display structure is lower than a light transmittance of the transparent display structure under a case where no electric field is provided between the first electrode layer and the second electrode layer; and
under a case where the transparent display structure is in a fourth state, the electric field is provided between the first electrode layer and the second electrode layer, the transparent display component layer is turned on, the color of the transparent display structure changes, and the transparent display structure performs semi-transparent display or one-sided display.

16. A transparent window having a display function, comprising:
the transparent display structure according to claim 1.

17. The transparent display structure according to claim 12, wherein the semiconductor layer is configured to generate the current under excitation of light with a predetermined wavelength among the light.

18. The transparent display structure according to claim 17, wherein the light with the predetermined wavelength comprises ultraviolet light or blue light.

* * * * *